United States Patent [19]
Whittaker et al.

[11] 3,943,213

[45] Mar. 9, 1976

[54] METHOD FOR MANUFACTURING HIGH TEMPERATURE GRAPHITE FIBER-GRAPHITE COMPOSITES

[75] Inventors: Mack P. Whittaker, Stamford, Conn.; Frederick C. Miller, Johnson City; Lloyd I. Grindstaff, Elizabethton, both of Tenn.

[73] Assignee: Great Lakes Carbon Corporation, New York, N.Y.

[22] Filed: Feb. 7, 1972

[21] Appl. No.: 224,247

Related U.S. Application Data

[63] Continuation-in-part of Ser. No. 26,137, April 6, 1970, abandoned.

[52] U.S. Cl. ............ 264/29; 264/DIG. 19; 423/445; 423/447; 423/449
[51] Int. Cl.² ..................................... B29C 25/00
[58] Field of Search ....... 264/29, DIG. 19; 423/447, 423/448, 445, 449

[56] References Cited
UNITED STATES PATENTS

| | | | |
|---|---|---|---|
| 3,367,812 | 2/1968 | Watts | 264/29 X |
| 3,392,216 | 7/1968 | Otani | 264/29 |
| 3,407,038 | 10/1968 | Beasley | 264/29 X |
| 3,534,803 | 10/1970 | Bickerdike et al. | 264/29 UX |
| 3,558,276 | 1/1971 | Otani | 264/29 X |
| 3,573,086 | 3/1971 | Lambdin, Jr. | 264/29 X |
| 3,629,379 | 12/1971 | Otani | 264/29 |
| 3,716,607 | 2/1973 | Otani | 264/29 |
| 3,787,541 | 1/1974 | Grindstaff et al. | 264/29 |

OTHER PUBLICATIONS

P. L. Walker (ed)., Chemistry and Physics of Carbon, Vol. 4, Marcel Dekker, Inc., New York, 1968, pp. 250–254 and 272–285.

White et al., "Mesophase Microstructures in Carbonized Coal-Tar Pitch," Carbon, Vol. 5, Pergammon Press Ltd., G. Brit, pp. 517–518.

*Primary Examiner*—Jay H. Woo
*Attorney, Agent, or Firm*—Donald R. Cassady

[57] ABSTRACT

Graphite composite, prepared by heating a material which forms a graphitizable carbon to mesophase, adding carbon fiber composite and carbonizing and graphitizing the shaped composite.

3 Claims, No Drawings

METHOD FOR MANUFACTURING HIGH TEMPERATURE GRAPHITE FIBER-GRAPHITE COMPOSITES

CROSS-REFERENCES TO RELATED APPLICATIONS

This application is a continuation-in-part of application Ser. No. 26,137, filed Apr. 6, 1970 and now abandoned.

BACKGROUND OF THE INVENTION

Carbon-graphite composites comprising laminates of graphite or carbon fibers and a carbon matrix prepared from epoxy, phenolformaldehyde, or like resin are well known in the art.

This invention relates to a laminated artificial graphite article, more particularly, to a graphitized carbon fiber-mesophase composite.

Graphite is a material which is a good conductor of heat and electricity, extremely resistant to high temperatures, and also highly resistant to attack by most chemical reagents. Accordingly, graphite is an extremely important and useful material in industry in a great variety of applications.

Almost all the artificial graphite which is made today is prepared according to the teaching first set forth by E. G. Acheson in 1896. Acheson's process, which was the first successful process for the commercial production of artificial graphite articles, has been somewhat modified since that time. As a general rule, artificial graphite articles are fabricated from petroleum coke base material. This process comprises intimately mixing coke particles with a coal tar or pitch binder and forming the mixture. The resultant shaped articles are baked at about 1000°C. and subsequently graphitized at 2500°C. to 3000°C. in an electric furnace.

When the above method is followed, a shaped graphite article is produced, or a graphite stock is produced, which can be shaped into the desired article by machining or other similar physical process.

The graphitized composites of this invention are especially useful for their primary structural properties, particularly high temperature applications, as for example over 1000°C. These uses can include space, re-entry, and suborbital flight applications, and the like. They can also be used to fabricate dies for hot molding operations in the preparation of ceramics and the like.

Additionally, for use as a moderator in nuclear reactors, graphite is used to slow down fast neutrons through collision of these fast neutrons, produced in the fission of U-235 atoms, with the moderator. The neutrons being moderated should spend the minimum possible time in the intermediate energy region where they are liable to be captured by the more abundant U-238 atoms and be lost to the system without producing further fission. A high density graphite moderator increases the compactness of the reactor. Therefore, composites of high density, approaching the theoretical density of carbon, 2.25 g/cm$^3$, are desired.

More recently, a process has been devised for preparing a very high density graphite by heating a liquefiable hydrocarbon e.g. a coker feedstock, to a temperature of at least 400°C. to form a fusible substance containing at least 75 percent by weight of mesophase, carbonizing the mesophase therefrom at about 400°C. to 500°C. and converting the resulting body to graphite by conventional graphitization techniques at temperatures of up to 3000°C.

OBJECTS OF THE INVENTION

It is an object of this invention to provide a high-density composite material.

It is a further object of this invention to provide a high-density composite material consisting exclusively of graphite.

It is a further object of this invention to provide graphite composite material of superior flexural properties.

It is a still further object of this invention to provide a high-density composite material wherein anisotropy can be controlled by controlling the orientation of the mesophase during fabrication.

Other objects of this invention will become obvious to those skilled in the art upon a further reading of the following description.

SUMMARY OF THE INVENTION

The above-enumerated objects are accomplished by the fabrication of a mesophase-carbon fiber composite consisting of about 1 to 50 weight percent of fiber, carbonization of the resulting composite at about 400° to 650°C. and graphitization of the carbon body by conventional graphitization methods. The thus formed graphite-graphite composite has an extremely high density, approaching the theoretical density of natural graphite. This extreme density is due to the fact that mesophase has a char yield of about 90 to 95 percent while the char yield of the polymeric resins of prior art composites is low, about 20 percent for epoxy resins and about 40 percent for phenolformaldehyde resins. Low char yields give rise to porous products upon carbonization and graphitization of the resulting composite. In addition, the fiber to matrix bonding strength is considerably greater between carbon fibers and mesophase than between carbon fibers and the prior art resins. It appears that the mesophase forms epitaxially along the fibers providing an optimum in binding strength between the carbon fibers and the carbonized mesophase.

DETAILED DESCRIPTION OF THE INVENTION

We have found that when mesophase and carbon fibers are used as the components of a composite and the composite is completely graphitized, there is considerable bonding strength between the matrix and the fibers in the graphitic body.

The new composite of this invention is typically prepared by dispersing from about 1 to about 10 weight percent of chopped carbon fibers (less than about one inch long) in a hot, fluid, mesophase system; then forming or casting a shaped article, and pyrolyzing and graphitizing the resulting article to about 3000°C.

Carbon fibers useful for this invention include rayon, cotton, cellulose, polyacrylonitrile and the like fibers pyrolyzed at about 500°C. to about 3000°C. and includes all fibers typically called carbon or graphite fibers. The fiber can be tows, batting, felts, yarns, monofilaments, or chopped fibers.

In order to form a completely graphitic structure, polyacrylonitrile or like fibers which are graphitizable, as for example in the form of a woven fabric, is admixed with mesophase to form a laminated body. This laminated body is pyrolyzed and then graphitized to form an extremely dense graphite body. In preparing the laminate, the use of graphite fibers of polyacrylonitrile yields the highest finished composite density, since shrinkage of the fiber and void at the fiber-matrix interface, predominately due to evaporation of volatiles, reduce the density of composites made from 500° to 1000°C. fibers.

Certain of the above fibers, notably cellulose fibers, will not graphitize when heated to temperatures necessary to form a graphite matrix. It is also within the contemplation of this invention to include graphitized composites containing these fibers in a graphitizable matrix within the scope of the invention. The product obtained by the graphitization of a composite consisting of a graphitizable matrix and a non-graphitizable fiber after graphitization would be termed a carbon-graphite composite.

The mesophase product useful as the matrix material of the instant invention can be prepared from any graphitizable carbon-forming pitch or like material. As used in this description and the appended claims, a graphitizable carbon-forming material can include coal tar pitch, vertical retort pitch, the petroleum ether-soluble fraction of coke oven pitch, the toluene-soluble fraction of coke oven pitch, pyridine-soluble fraction of coke oven pitch, petroleum virgin and synthetic residues, vitrinites from bituminous coals, naphthracene, polyvinyl chloride, and like materials that form a graphitizable carbon.

The starting pitch or like material is heated to about 400° to 500°C. at which point the mesophase is formed. The fibers can be mixed with the mesophase matrix material at or below the point at which mesophase is formed. The forming or casting of the finished article however is performed after the mesophase has been formed. Such forming or casting can be carried out with or without external pressure being applied.

The following examples are illustrative of the method of preparing the composite of this invention.

EXAMPLE 1

Polyacrylonitrile-based carbon fibers of average length one-fourth inch were dispersed in hot mesophase (400°C.) at about 5 weight percent fiber. The mixture was placed in a 1 inch diameter mold and compressed to 20,000 p.s.i.g. Heat was applied to 550°C. the pressure was then released and the composite baked at 900°C. for 3½ days, then graphitized at 2500°C. for 4 days. The apparent density of the composite piece was 1.8 g/cm$^3$.

The composite possesses all the benefits of a molded graphite body as heat and electricity conductors, heat and chemical resistance and additionally has the added structural properties of a composite.

EXAMPLE 2

A sample of coal tar pitch was heated to 440°C. for 16 hours. The sample was cooled and a quinoline insolubles determination on a portion thereof showed the sample to contain 95.0 percent mesophase.

Acrylonitrile-based carbon fiber which had been heat treated to about 2600°C. was chopped into one-eighth inch pieces and a composite was prepared from the mesophase and fiber containing 20 weight percent fiber at above the softening point of the mesophase.

A second sample of the above coal tar pitch was softened and a comparable composite prepared as above containing 20 weight percent of one-eighth inch chopped carbon fibers.

The two composites were baked at 1000°C. for 7 days and graphitized under the following heating schedule: 2700°C. over 2 days at room temperature to 1000°C. over 1 hour; 1000°C. to 2500°C. at 90°C./hour and 2500°C. to 2700°C. at 30°C./hour and the remaining time at 2700°C.

After cooling, the following comparative physical properties were determined:

|  | Pitch Fiber | Mesophase-Fiber |
| --- | --- | --- |
| Modulus of Rupture (transverse to molding pressure) | 450 psi | 1050 psi |

We claim:
1. A method of forming a graphite composite which consists in
   1. heating a graphitizable carbon-forming material to form mesophase;
   2. adding a graphitizable carbon fiber thereto;
   3. forming or casting the shaped article from (2); and
   4. carbonizing and graphitizing the formed article.
2. The method of claim 1 wherein the carbon fiber is selected from the group of carbon yarn, chopped fibers, felt, tow and batting.
3. The method of claim 1 wherein about 1 to about 50 weight percent of carbon fiber is added to step (2).

* * * * *